US007603352B1

(12) United States Patent
Vassallo et al.

(10) Patent No.: US 7,603,352 B1
(45) Date of Patent: Oct. 13, 2009

(54) ADVERTISEMENT SELECTION IN AN ELECTRONIC APPLICATION SYSTEM

(75) Inventors: Steven Vassallo, Redwood City, CA (US); Marc L. Andreessen, Palo Alto, CA (US)

(73) Assignee: Ning, Inc., Mountain View, CA (US)

( * ) Notice: Subject to any disclaimer, the term of this patent is extended or adjusted under 35 U.S.C. 154(b) by 97 days.

(21) Appl. No.: 11/213,309

(22) Filed: Aug. 26, 2005

Related U.S. Application Data

(63) Continuation-in-part of application No. 11/134,250, filed on May 19, 2005.

(51) Int. Cl.
*G06F 7/00* (2006.01)
*G06F 17/30* (2006.01)

(52) U.S. Cl. .......................................................... 707/6

(58) Field of Classification Search ....................... None
See application file for complete search history.

(56) References Cited

U.S. PATENT DOCUMENTS 5,446,891 A * 8/1995 Kaplan et al. .................. 707/2
6,009,410 A * 12/1999 LeMole et al. ................ 705/14
6,314,451 B1 * 11/2001 Landsman et al. .......... 709/203
6,356,934 B1 3/2002 Delph
6,754,885 B1 * 6/2004 Dardinski et al. ........... 717/113
6,934,740 B1 8/2005 Lawande et al.
7,043,716 B2 5/2006 Zimmer et al.
7,139,761 B2 11/2006 McKibben et al.
7,269,590 B2 9/2007 Hull et al.
7,502,855 B2 3/2009 Swanson et al.
2003/0105811 A1 6/2003 Laborde et al.
2003/0149975 A1 * 8/2003 Eldering et al. ............... 725/34
2003/0187921 A1 10/2003 Diec
2004/0083264 A1 4/2004 Veselov
2004/0187136 A1 9/2004 Bhogal et al.
2005/0015809 A1 1/2005 Boys
2005/0097006 A1 5/2005 Nyako
2005/0102324 A1 5/2005 Spring et al.
2005/0160094 A1 7/2005 Morgenstern et al.
2005/0193054 A1 9/2005 Wilson et al.
2005/0216300 A1 9/2005 Appelman et al.
2006/0026668 A1 2/2006 Karoubi (Continued)

OTHER PUBLICATIONS

Mathes, "Folksonomies—Cooperative Classification and Communication Through Shared Metadata" (http://web.archive.org/web/20041230205122/http://www.adammathes.com/academic/computer-mediated-communication/folksonomies.html), Dec. 30, 2004, 1-20.*

(Continued)

*Primary Examiner*—John E Breene
*Assistant Examiner*—Aleksandr Kerzhner
(74) *Attorney, Agent, or Firm*—Fenwick & West LLP

(57) ABSTRACT

Selecting advertisements to deliver to a user of an electronic application system. Selecting includes storing a plurality of user defined object types for defining attributes of user contributed objects, and storing a plurality of user contributed objects, each having an object type. Selecting further includes receiving from a user a request for one or more of the stored objects, wherein at least one of the requested objects has a user defined object type, and selecting an advertisement to provide to the user based at least in part on the user defined object type of the one or more requested objects.

15 Claims, 21 Drawing Sheets

U.S. PATENT DOCUMENTS

| | | | | |
|---|---|---|---|---|
| 2006/0122974 | A1 | 6/2006 | Perisic | |
| 2006/0195460 | A1 | 8/2006 | Nori et al. | |
| 2006/0195521 | A1 | 8/2006 | New et al. | |
| 2006/0242178 | A1* | 10/2006 | Butterfield et al. | 707/100 |
| 2006/0242554 | A1 | 10/2006 | Gerace et al. | |
| 2006/0248573 | A1 | 11/2006 | Pannu et al. | |
| 2007/0088671 | A1* | 4/2007 | McElroy et al. | 707/1 |
| 2008/0086564 | A1 | 4/2008 | Putman et al. | |
| 2008/0201299 | A1 | 8/2008 | Lehikoinen et al. | |

OTHER PUBLICATIONS

Flickr, "Photo tags" (http://web.archive.org/web/20040607053757/http://www.flickr.com/photos/tags), Jun. 7, 2004, 1-3.*

Linderman, "The Spread of Weighted Lists" (http://www.37signals.com/svn/archives/000937.php), Dec. 2, 2004, 1-4.*

Strutz, "Communal Categorization: The Folksonomy" (http://www.davidsturtz.com/drexel/622/sturtz-folksonomy.pdf), Dec. 16, 2004, 1-8.*

Author Unknown, Sun Java System Application Server, http://www.sun.com/software/products/appsrvr/index.xml.

Jotspot, Jotspot—The Application Wiki, http://jot.com/index.php.

Customforce, Customizable CRM-Salesforce.com, www.customforce.com.

Blogger, Blogger: Create your Blog Now, http://www.jot.com/index.php.

Textdrive, http://www.textdrive.com/.

Yahoo, Yahoo! GeoCities, http://geocities.yahoo.com/.

Bluehost, Web hosting provider—Bluehost.com, http://www.bluehost.com/.

Macromedia, ColdFusion MX 7, http://www.macromedia.com/software/coldfusion/.

Bea, Bea Systems, http://www.bea.com/framework.jsp?CNT=homepage_main.jsp&FP=/content.

IBM, IBM WebSphere Software, http://www-306.ibm.com/software/websphere/#.

JBOSS, JBoss.com-Professional Open Source™ from JBoss Inc. , http://www.jboss.com/.

Blogging Software, Business Blogs & Blog Services at TypePad.com, www.typepad.com.

Apache Tomcat, The Apache Software Foundation, http://tomcat.apache.org/.

The Apache Software Foundation, http://apache.org.

Bayeh, E., "The WebSphere Application Server Architecture and Programming Model," IBM Systems Journal, Java Technology, 1998, vol. 37, No. 3 [online] [Retrieved on Jun. 16, 2008] Retrieved from the Internet<URL:http://www.research.ibm.com/journal/sj/373/bayeh.html>.

Archive of "J2EE™ Developer's Guide—Scenarios," Sun Microsystems, Inc., pp. 1-4, [online] [Archived by http://archive.org on Nov. 11, 2001; Retrieved on Jun. 16, 2008] Retrieved from the Internet<URL:http://web.archive.org/web/20011119203713/java.sun.com/j2ee/sdk_1.2.1/techdocs/guides/ejb /html/Security4.html>.

Bal, H.E. et al., "A Distributed Implementation of the Shared Data-Object Model," 1989, pp. 214-232, [online] Retrieved from the Internet<URL:http://citeseerx.ist.psu.edu/viewdoc/summary?doi=10.1.1.45.1878>.

Archive of Flickr Photo Sharing Website, www.flickr.com/photos/tags, pp. 1-2, [Online] [Archived by http://archive.org on Apr. 24, 2005; Retrieved on Aug. 30, 2008] Retrieved from the Internet<URL:http://http://web.archive.org/web/20050424233308/flickr.com/photos/tags/>.

U.S. Office Action, U.S. Appl. No. 11/134,250, filed Jun. 23, 2008, 23 pages.

U.S. Office Action, U.S. Appl. No. 11/134,250, filed Nov. 18, 2008, 50 pages.

U.S. Office Action, U.S. Appl. No. 11/134,250, filed May 5, 2009, 26 pages.

U.S. Office Action, U.S. Appl. No. 11/141,983, filed Sep. 3, 2008, 17 pages.

U.S. Office Action, U.S. Appl. No. 11/141,983, filed Mar. 18, 2009, 15 pages.

U.S. Office Action, U.S. Appl. No. 11/195,378, filed Mar. 10, 2008, 44 pages.

U.S. Office Action, U.S. Appl. No. 11/195,378, filed Sep. 29, 2008, 42 pages.

U.S. Office Action, U.S. Appl. No. 11/195,349, filed Aug. 19, 2008, 12 pages.

U.S. Office Action, U.S. Appl. No. 11/195,349, filed Apr. 3, 2009, 9 pages.

* cited by examiner

500

| Object ID | Object Type | What User Has Tagged This Object (Tag Phrase) | Number of Times User Has Used This Tag Phrase | Tag Strength (Assigned by This User) |
|---|---|---|---|---|
| 324432 | photo | restaurant | 34 | 5 |
| | | san francisco | 91 | (none) |
| | | yum | 21 | 4 |
| | | bargain | 1 | 1 |
| | | | | |
| 89 | URL | restaurant | 34 | 3 |
| | | restaurant review page | 1 | 5 |
| | | | | |
| 54890 | photo | restaurant | 34 | 4 |

FIG. 5

| Object ID | Object Type | What Other Users Have Tagged This Object | Number of Times Other Users Have Used This Tag Phrase on this Object |
|---|---|---|---|
| 324432 | photo | food | 880 |
| | | restaurant | 1321 |
| | | pizza | 2311 |
| | | | |
| 89 | URL | restaurant review | 7112 |
| | | review | 3662 |
| | | restaurant | 887 |
| | | | |
| 54890 | photo | restaurant | 1320 |
| | | california | 21 |
| | | pizza | 161 |
| | | friends | 2 |

FIG. 6

| Object ID | Object Type | What User Has Tagged This Object (Tag Phrase) | Number of Times User Has Used This Tag Phrase | Other Objects (Types) User Has Tagged Using This Tag Phrase | Other Objects (Types) Others Have Tagged Using this Tag Phrase |
|---|---|---|---|---|---|
| 324432 | photo | san francisco | 91 | classified (21), restaurant (9) | |
| | | yum | 21 | restaurant (12) | recipe (41) |
| | | bargain | 1 | restaurant (11) | classified (119), car (2), computer (819) |

FIG. 8A

| Object Type | Number of Times This Object Type Has Been Tagged |
|---|---|
| car_photo | 212 |
| restaurant | 54 |
| review | 12 |
| blog | 17 |

FIG. 8B

| Object Type | Number of Objects of This Object Type Contributed by User | Object Type Define by this User? |
|---|---|---|
| garden_photo | 87 | yes |
| restaurant | 3 | no |
| review | 12 | no |
| car_blog | 0 | yes |

FIG. 8C

ADVERTISEMENT SELECTION IN AN ELECTRONIC APPLICATION SYSTEM

CROSS REFERENCE TO OTHER APPLICATIONS

This application is a continuation in part of co-pending U.S. patent application Ser. No. 11/134,250 entitled HOSTED APPLICATION SERVER filed May 19, 2005, which is incorporated herein by reference for all purposes.

BACKGROUND OF THE INVENTION

Various web applications utilize some form of targeted advertising. For example, a search engine application might deliver advertisements based on the text entered in a search query. A user searching for "Hawaii" might be presented with advertisements for vacation packages to Hawaii, for example. An email application could deliver advertisements based on the content of the email message. However, such methods are limited by how well the interests of the user correlate with the text in a search query or in an email message. For example, an employee might receive many email messages about a work related issue, but have no interest in buying products related to his work. The employee might be much more interested in food, but it would be difficult to determine this from the email he receives. Improved methods of selecting and delivering targeted content are needed.

BRIEF DESCRIPTION OF THE DRAWINGS

Various embodiments of the invention are disclosed in the following detailed description and the accompanying drawings.

FIG. 5 is a table illustrating an example of information in a user profile.

FIG. 6 is a table illustrating an example of information in a user profile.

FIG. 8A is a table illustrating an example of other information in an object profile.

FIG. 8B is a table illustrating an example of information in a user profile.

FIG. 8C is a table illustrating an example of information in a user profile.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
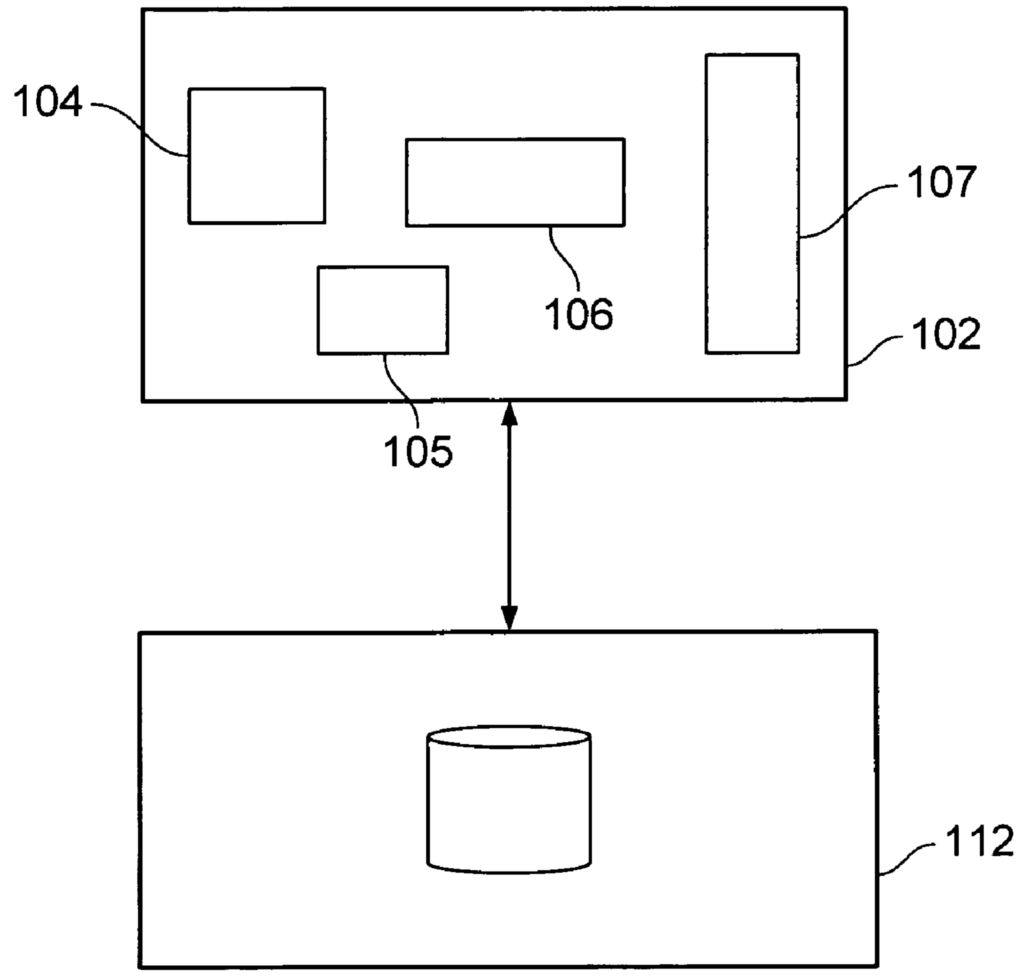
FIG. 1A is a diagram illustrating an embodiment of an application.

FIG. 1A is a diagram illustrating an embodiment of an application. In the example shown, application 102 runs on server 112. In some embodiments, application 102 is a web application running on web server 112. Application 102 is shown to display objects 104-107. For example, application 102 could be displayed in a web browser. Server 112 is shown to include a database of objects. An object, as used herein, could refer to a content object, content, user, application, or tag.

Objects 104-107 could include, for example, photos, blogs, reviews, classified advertisements, profiles, images, bookmarks, jobs, books, and/or movies, etc. For example, objects 104-107 could include a set of photos. In another example, object 104 could be a photo of a teacher, object 106 could be a profile of the teacher, and object 105 could be a review of that teacher.

In this example, application 102 allows users to view and tag objects. Tagging refers to assigning a string (e.g., one or more words) to an object. The string is referred to as a tag, tag word, or tag phrase. An object can be tagged with any tag phrase desired. Thus, tag phrases can be personal, such as "John Doe's tag phrase". Objects that can be tagged include content objects, users, profiles, and/or applications. In some embodiments, an application and/or a user can assign a tag.

In some embodiments, application 102 includes an interface for searching for objects associated with a tag phrase. For example, a photo sharing application could allow a user to upload and tag photos. A first user could tag all his Hawaii vacation photos "Hawaii". A second user wishing to see photos of Hawaii could use the search interface to search for all photos tagged "Hawaii" and photos tagged Hawaii would be returned, including the first user's photos.

In some embodiments, application 102 is an application running on a hosted application server system that could include multiple applications, multiple user contributed objects and multiple user defined object types, as more fully described below. For example, object 107 could comprise a sidebar that could display system information and/or targeted content, such as advertising.

Figure 1B:
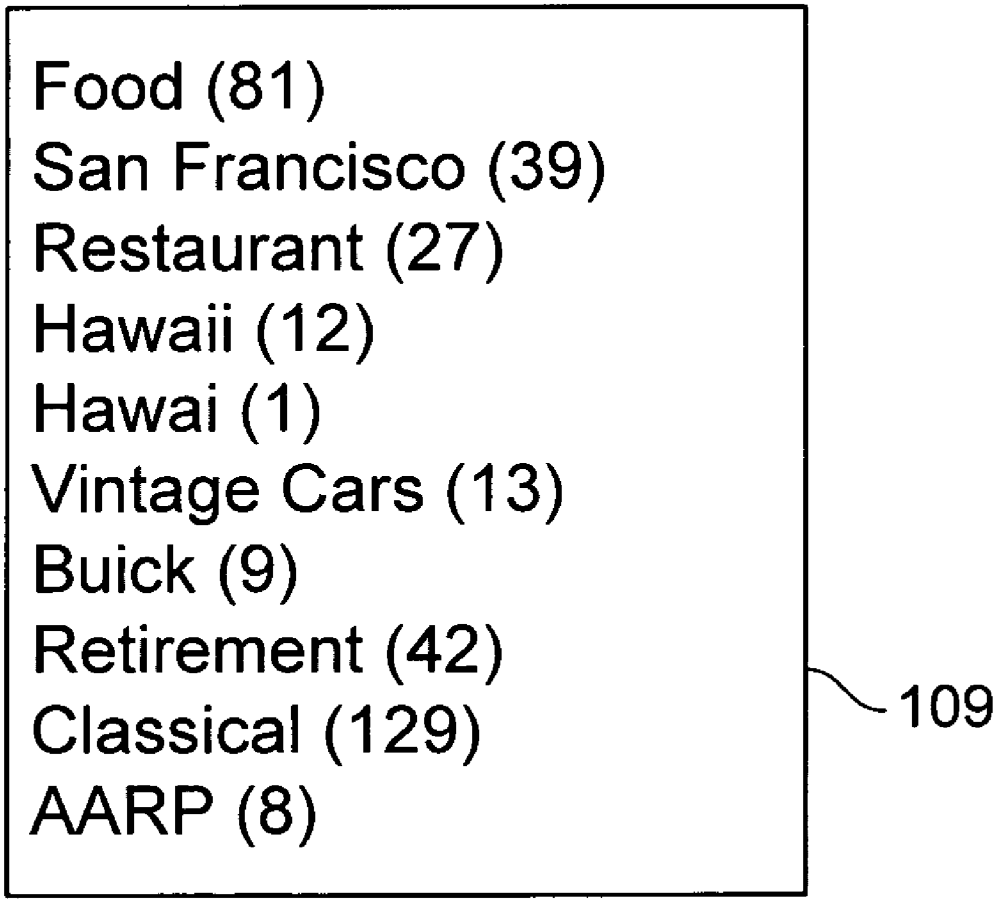
FIG. 1B is a diagram illustrating a list of tag phrases.

FIG. 1B is a diagram illustrating a list of tag phrases. In some embodiments, application 102 displays list 109, for example, in a sidebar. In this example, list 109 includes a list of tag phrases assigned by a user. Each tag phrase is followed in parentheses by the number of times that that tag phrase has been used by the user.

In various embodiments, list 109 could indicate which tag phrases are the most popular, most frequently, and/or most recently assigned. The list could include tags assigned by other users (e.g., friends), or by all users. Selecting (e.g., using a mouse to click on) one of the tag phrases might cause objects or a list of objects associated with the tag phrase to be displayed.

For example, list 109 could be displayed by a bookmarking application that allows a user to store and tag various bookmarks (i.e., URLs). A user could bookmark a webpage by tagging its URL. For example, the user could tag URLs of various food related webpages with the tag "food". The user could select "food" in list 109 and a list of the pages tagged "food" would be returned. The list could include pages tagged food by the user and/or other users.

The tag phrases in list 109 could be used to determine information about the user. For example, list 109 indicates that the most frequently used tag four tag phrases are "Food", "San Francisco", "Restaurant", and "Retirement". The tag phrase "Food" was used 81 times, the tag phrase "San Francisco" was used 39 times, the tag phrase "Restaurant" was used 27 times, and the tag phrase "Retirement" was used 42 times. Thus, it may be determined that the user would be interested in food or restaurant related products, and especially those located in San Francisco. In addition, it may be determined that the user is retired and would be interested in retirement related products. This could also be determined from the fact that the user has tagged "Vintage Cars", "Buick", "AARP", and "Classical" a moderate number of times. The user has tagged "Hawaii" 12 times and "Hawaii" one time. "Hawaii" could have been a typographical error entered by the user in this example.

Figure 1C:
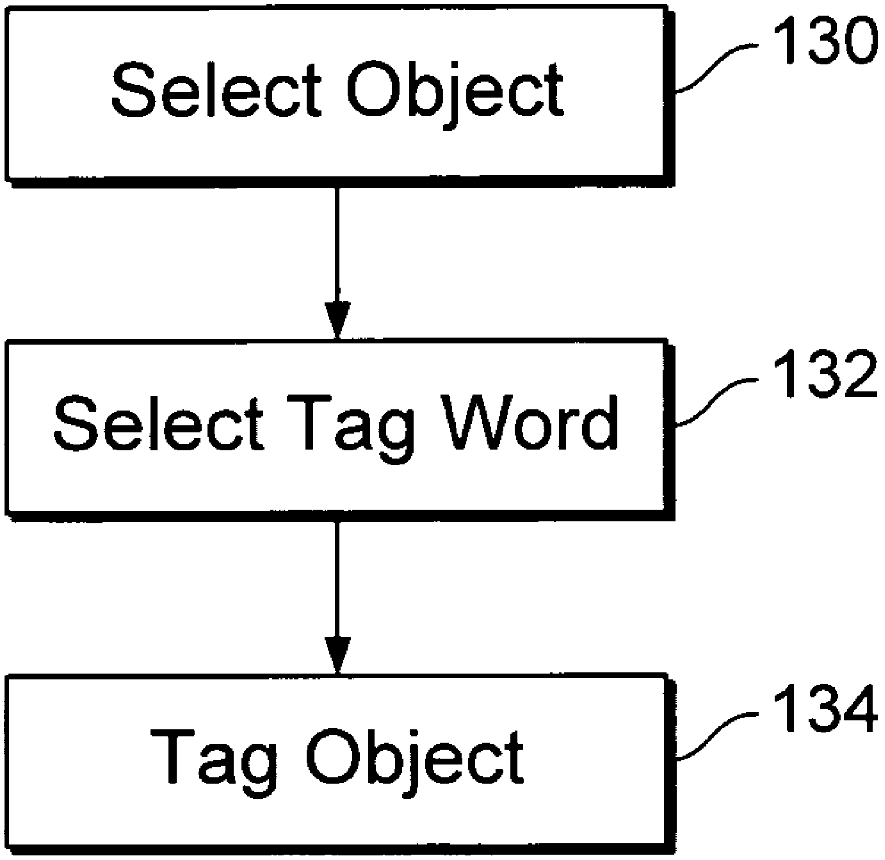
FIG. 1C is a flowchart illustrating an embodiment of a process for tagging an object.

FIG. 1C is a flowchart illustrating an embodiment of a process for tagging an object. In this example, at 130, an object is selected. The object is the object that the user would like to tag. In some embodiments, the object could include a content object, an application, or a user. The object can be selected in various ways in various embodiments. Various user interfaces (UIs) can be used for selecting the object to tag. For example, the object can be selected by viewing the object, such as a photo or a webpage. The object can be selected by highlighting, checking a checkbox, selecting a button, etc. The object can be selected using a bookmarklet to bookmark a page.

At 132, a tag phrase is selected. The tag phrase can include a string. In some embodiments, the tag phrase is a keyword or descriptive label selected by the user to associate with the object. Examples of tag phrases include "family", "XML", "humor", "to read", "reference", "work", "Bob Johnson's personal tag phrase", "e@$#*&(]jj", etc. In some embodiments, the tag phrase can be selected from a pull down or other menu of commonly used (e.g., by the user or other users) tag phrases, where the menu might be provided as a convenience to the user.

At 134 the object is tagged. The tag phrase is associated with the object. In some embodiments, this information is stored in a database. In various embodiments, a user could tag an object because it is interesting to the user and/or the user wants to have some way of finding the object again. In some embodiments, users can view other users' tags. The user may tag an object because the user wants to be known to have tagged that object and/or wants to be characterized by having tagged that object. Tags can be viewed as a way for a user to personally express himself.

In some embodiments, a tag strength is also selected and associated with the tag. For example, the user could select a score (e.g., 1-5) indicating the strength or importance of the tag to the user. For example, if the object is a photo, the user might select a tag strength of 1 for a bad representation of a bridge (e.g., a photo that cuts off half of a one lane bridge) and 5 for a good representation of a bridge (e.g., a panoramic photo of the Golden Gate Bridge). The tag strength can be optional—a user can assign a tag strength to some tags, and not to others.

The meaning of a tag strength can be defined in various ways by various users. For example, a first user might use tag strength to indicate how well the tag describes the object being tagged, as in the bridge example above. A second user might use tag strength to indicate the quality of photos the user tags. For example, a blurry photo might be given a tag strength of 1. A third user might use tag strength to indicate the importance of bookmarks the user tags. For example, webpages with a tag strength of 5 could indicate that those webpages contain information that is most useful or most entertaining to the user. Alternatively, webpages with a tag strength of 1 could indicate that those webpages are first in priority, e.g., for the user to read next.

Figure 2A:
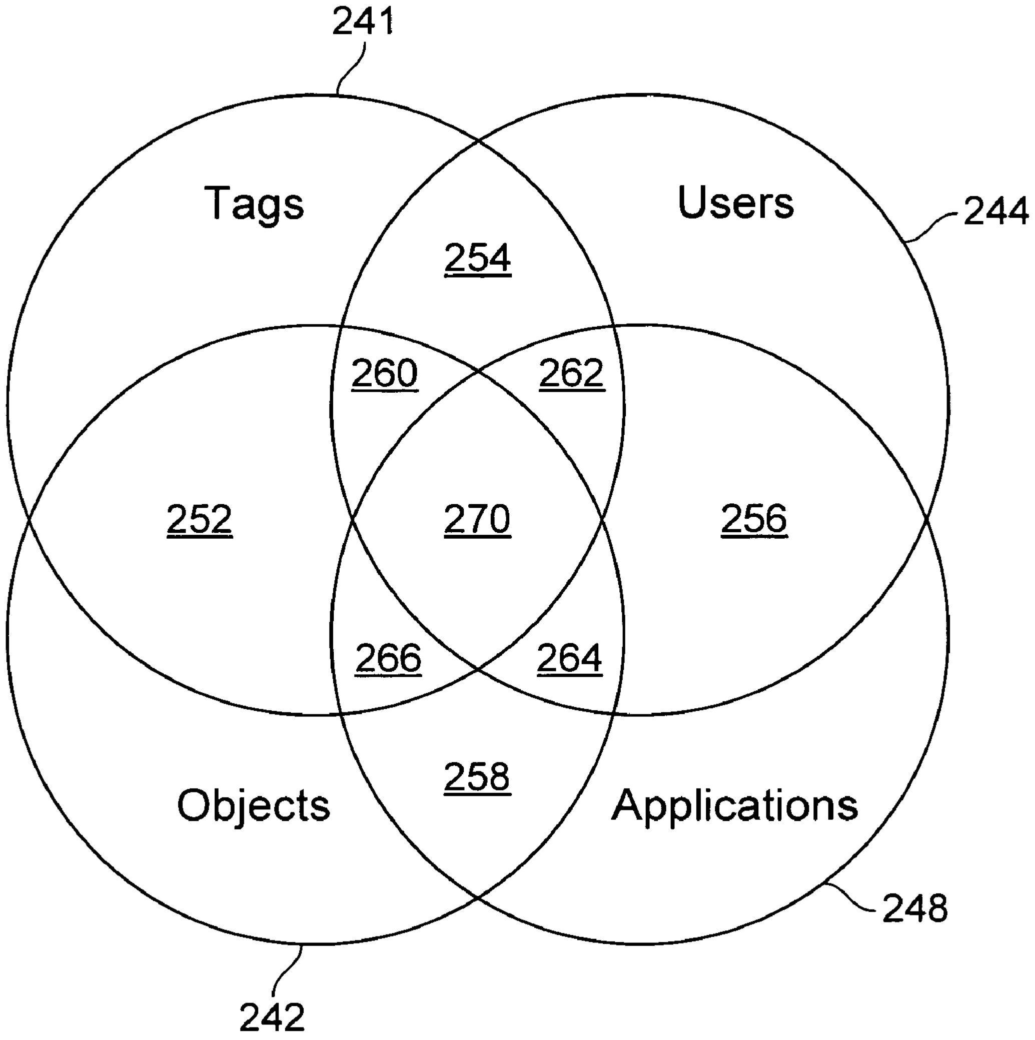
FIG. 2A illustrates a diagram of relationships.

FIG. 2A illustrates a diagram of relationships. In this example, various relationships between tags, users, objects, and application are represented by various regions as shown. The region enclosed by circle 241 represents tags. The region enclosed by circle 244 represents users. The region enclosed by circle 242 represents objects. The region enclosed by circle 248 represents applications. The overlapping regions represent relationships between these items. The following table illustrates a few examples of the relationships that could correspond to the overlapping regions.

| Region in FIG. 2A | Relationship(s) |
|---|---|
| 252 | tag on object |
| 254 | tag on user |
| 256 | user of application or user who owns application |
| 258 | object in application |
| 262 | tag on application by user or tag on user by application |
| 264 | tag on object in application by user or tag on object by application |
| 270 | tag on object in application by user |

Figure 2B:
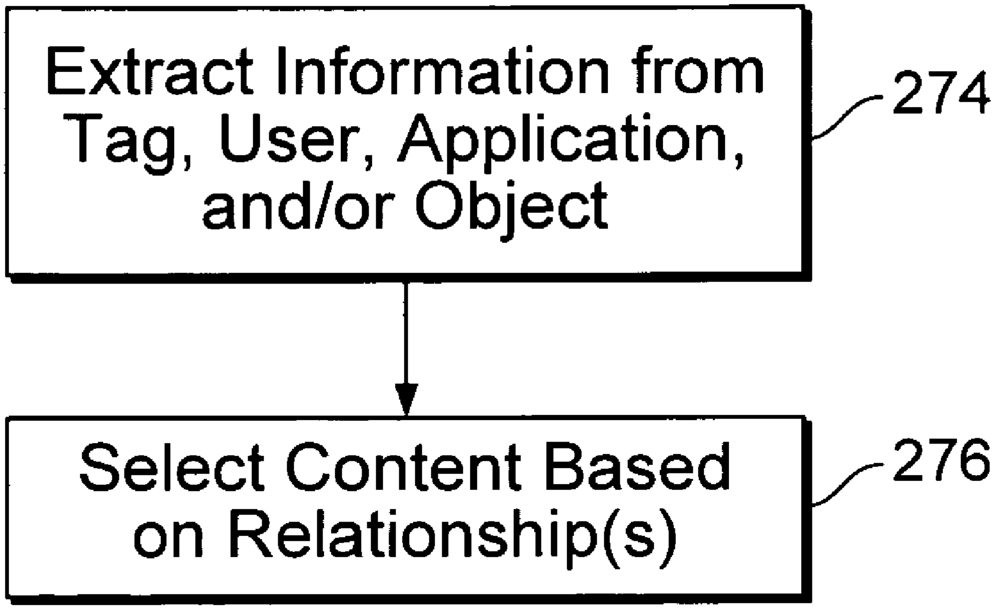
FIG. 2B is a flowchart illustrating an embodiment of a process for selecting content.

FIG. 2B is a flowchart illustrating an embodiment of a process for selecting content. In the example shown, at 274, information is derived or extracted from tag(s), user(s), application(s), and/or object(s). In some embodiments, information about a tag, user, application, or object can be captured and maintained in a tag profile, user profile, application profile, or object profile, respectively.

For example, a user profile could include applications contributed to or tagged by the user, tags contributed by the user, content types contributed or tagged by the user, a location associated with the user, and users tagged by the user, etc.

An application profile could include, for example, the current user, the user who contributed the application, tags assigned to objects in (e.g., owned by) the application, content types used in the application, and a description of the application, etc.

A tag profile could include, for example, related tags (e.g., tag phrase "cyan" and "blue" might be related if an object has been tagged "cyan" and "blue" by the same or different users), users who contributed the tag, the application used to contribute the tag, the user, application, or object that is tagged, etc.

An object profile could include, for example, tag(s) assigned to the object, user(s) who tagged the object, the user who contributed the object, the application that owns the object, the content type of the object, and various attributes of the object.

At 276, content is selected based on relationship(s) between two or more of the tag(s), user(s), application(s), and/or object(s). For example, information in profiles includes relationships between other tag(s), user(s), application(s), and/or object(s). Any of these or other relationships can be used to select content.

Figure 2C:
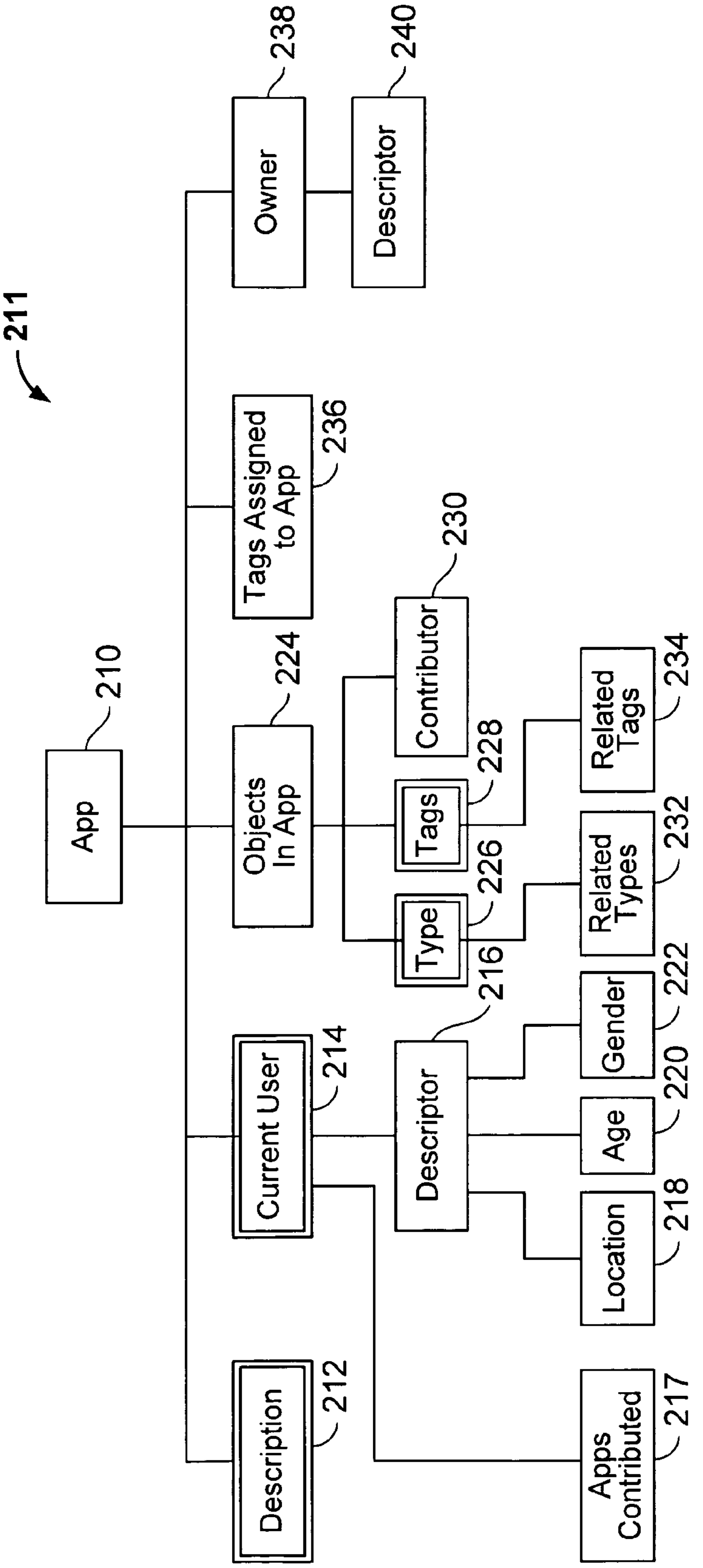
FIG. 2C is a diagram illustrating an example of a tree of relationships.

FIG. 2C is a diagram illustrating an example of a tree of relationships. In this example, an application profile is represented by tree 211 of relationships. As shown, application 210 has a description 212, a current user 214, objects 224 in application 210, tags 236 assigned to application 210, and owner 238 of application 210. Description 212 could be a text description, such as "This application is for sharing information about travel in Hawaii." Current user 214 has a descriptor 216 that includes various attributes, including location 218, age 220, and gender 222. Any other attributes can be included in descriptor 216 in various embodiments. Current user 214 has contributed applications 217. Each object 224 in application 210 has a type 226, contributor 230, and possibly one or more tags 228. Type 226 could have related types 232. For example, type "restaurant" could be related to type "recipe". Tags 228 could have related tags. For example, tag "dog" could be related to type "canine". In some embodiments, a thesaurus is maintained for related types and/or tag phrases. Owner 238 of application 210 is the developer of application 210. Owner 238 could be another user or current user 214. Owner 238 has a descriptor 240, that could include the same or different attributes as those in descriptor 216.

In some embodiments, description 212, current user 214, type 226 and tags 228 are the drivers for selecting content. For example, if a user is viewing an application, the description of the application, the descriptor of the current user, the type of objects in the application, and the tags (by the current user and/or other users) on the application are analyzed. Content is selected based on this analysis. In various embodiments, each of these drivers is weighted so that, for example, tags 228 have a greater influence on content selection than say, description 212.

For example, suppose a user is viewing a photo sharing application. The application has the description "travel photos". The descriptor of the user indicates that the user is a 35 year old female living in San Francisco. The objects in the application are of type photo and the most popular (e.g., the top 3 tags) are "italian", "restaurant", and "food". The content selected might then be an advertisement for an Italian restaurant in San Francisco, or a travel article on the history of North Beach in San Francisco. If, for example, the application description is weighted less, then the travel article may not be selected. Instead, an article of the best Italian food in San Francisco could be selected, for example.

Other drivers could include any of the other items shown, such as tags 236 assigned to the application, or the descriptor 240 of the owner of the application. In the above example, if the top tags assigned to the application include "cheap" and "fast", then the content selected might be an advertisement for a pizzeria in San Francisco.

In various embodiments, the tree can be extended to include other relationships. For example, contributor 230 could be another user or current user 214. In the case of another user, a descriptor of that other user could also be analyzed to select content. For example, a block representing that descriptor could connect to contributor block 230. In another example, objects contributed by the current user could be analyzed. For example, a block representing those objects could connect to current user block 214 or to descriptor block 216.

In another example, a block representing a related user (e.g., through a social network) could connect to current user block 214 or owner block 238. Information associated with the related user could be analyzed.

In this way, tree 211 is part of a network of relationships. In this example, the network of relationships is shown to form around an application. A network can be formed around a user, a tag, or an object. The networks can interconnect. For example, a network of relationships can be formed around current user 214 based on the user profile of current user 214. Any of this information can be used to select content.

Figure 2D:
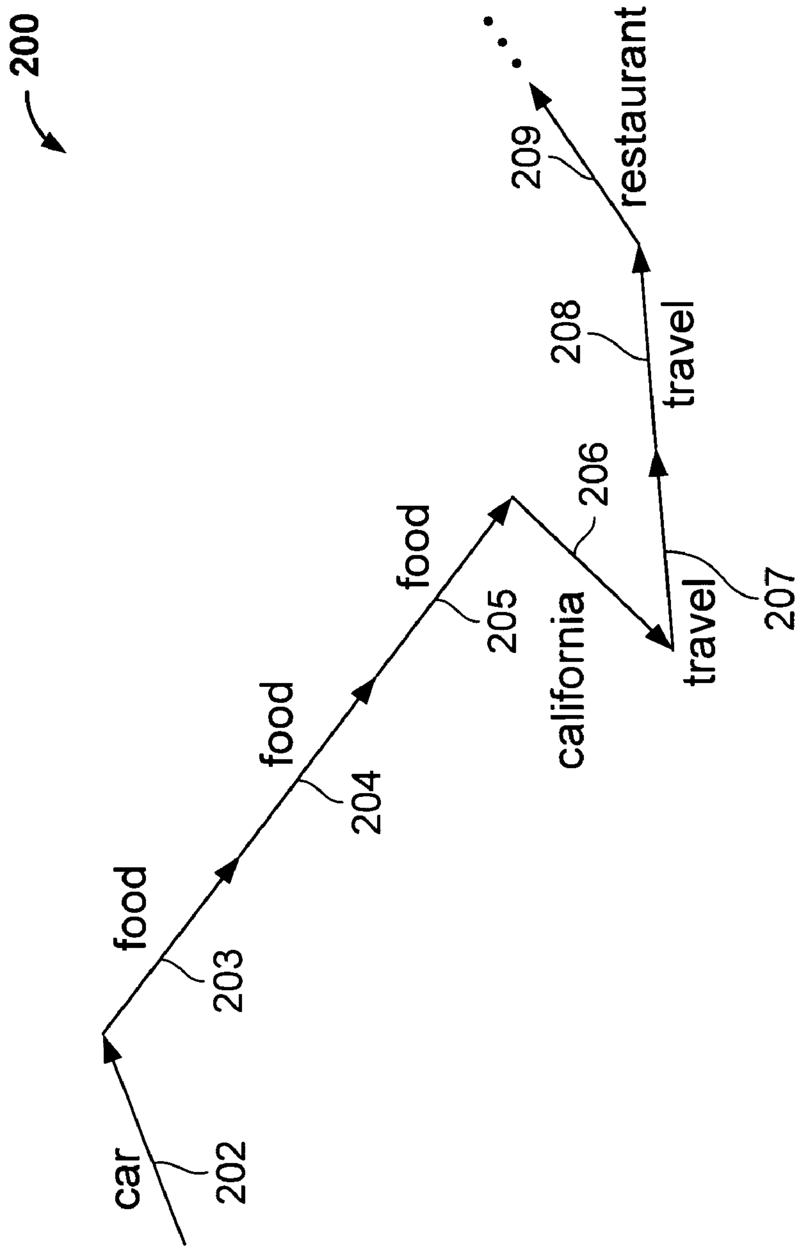
FIG. 2D is a diagram illustrating a vector diagram of tag phrases.

FIG. 2D is a diagram illustrating a vector diagram of tag phrases. This example shows how tag phrases can be used to learn about a user. In this example, a set of tags that have been assigned by a particular user are represented by a set of vectors 200, including vectors 202-209. Each new tag that is assigned by the user adds a new vector to the diagram. As shown, the user has used the tag phrases "car", "food", "california", "travel", and "restaurant". Tag phrase "food" has been used three times. Tag phrase "travel" has been used twice. These tag phrases have not all necessarily been assigned to the same object. For example, "car" may have been assigned to a car classified listing. "food" may have been assigned to a recipe, a restaurant review, and a URL of a guide to California restaurants. "California" may have also been assigned to the URL of the guide to California restaurants. Similarly, "travel" may have been assigned to one or two content objects. In this way, each new vector added improves the description of this particular user.

In some embodiments, information about a user can be captured and maintained in a user profile. For example, the user profile could include the tag phrases the user has selected or contributed and the number of times each tag phrase is used. From the profile, information about the user could be derived. The information could include the user's interests, habits, affiliations, or any other information. For example, "food" has been used three times and "travel" has been listed twice. In addition, "restaurant" has been used once, and it could be determined that "restaurant" is a term that is related to "food". Thus, this user might be someone who has a very strong interest in food and somewhat of an interest in travel.

In some embodiments, vectors 202-209 are added in chronological order. Thus, the most recent tags would be shown on the right hand side. The oldest tags would be shown on the left hand side. Thus, additional information about the user could be determined. For example, if there were a large number of "Hawaii" tags to the left of vector 202, and no "Hawaii" tags in the later vectors (e.g., from 202 to 209 and past 209), then it could be determined that perhaps there used to be an interest in Hawaii, but the user is no longer interested in Hawaii. For example, the user was planning a trip to Hawaii, but has now already completed the trip.

Figure 3:
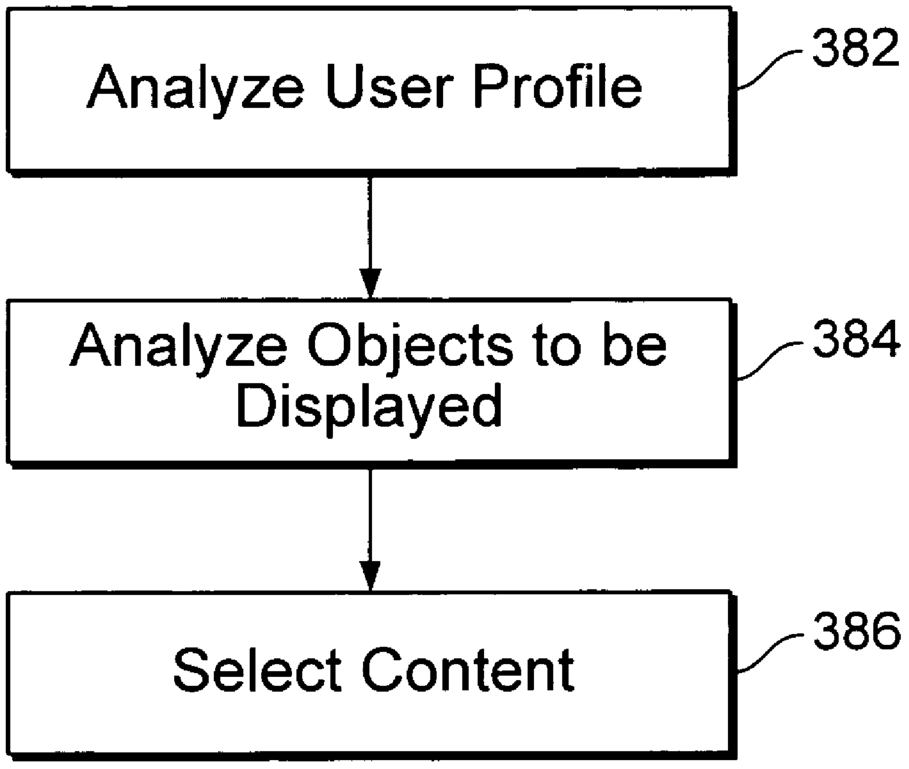
FIG. 3 is a flowchart illustrating an embodiment of a process for selecting content.

FIG. 3 is a flowchart illustrating an embodiment of a process for selecting content. In the example shown, at 382, a user profile is analyzed. For example, the user profile could include information provided by the user, and/or information collected based on the user's actions. Information provided by the user could include information provided when the user registered for an account, for example. Information collected about the user could include tag information, such as the objects the user tagged, the tag phrases used, and the number of times each tag phrase was used, the objects the user has contributed, the object types the user has defined, etc. In some embodiments, if the user owns (e.g., has created) an application, the user profile could include information associated with the application, such as tag phrases that the user or other users have used to tag the application, and the frequency of each of those tag phrases.

At 384, the objects to be displayed are analyzed. For example, if the user is viewing a page of a photo sharing application, the objects in that page are analyzed. In some embodiments, object profiles of one or more of those objects are analyzed. All the objects on the page could be analyzed, or one or more selected objects could be analyzed. For example, if the page focuses on one or more particular objects, those objects could be analyzed. Analyzing the object could include identifying the tag phrases that the user and/or others have assigned to that object and the number of times each of those tag phrases has been used by the user and/or others.

At 386, content is selected. For example, the content could be selected based on the analysis of the user profile and/or one or more of the object(s) that are being displayed. As such, 382 or 384 could be optional. The content could be selected independently of the content that is being displayed to the user. The content could be selected independently of the user.

Examples of content selected include advertising content, targeted content, or any other type of content. The content could include text, images, or any form of media. A content provider could specify the criteria for selecting the provider's content.

Figure 4:
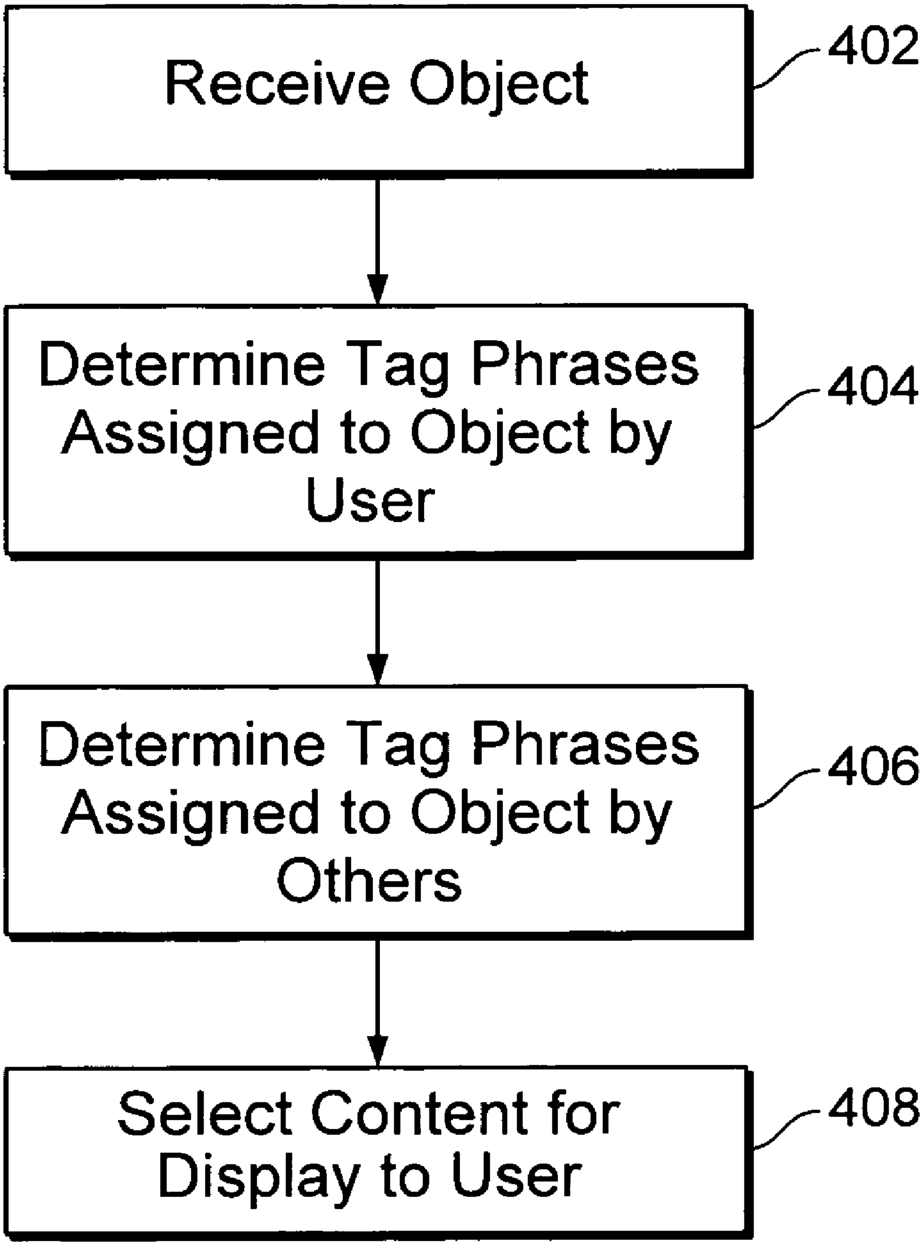
FIG. 4 is a flowchart illustrating an embodiment of a process for deriving or extracting information.

FIG. 4 is a flowchart illustrating an embodiment of a process for deriving or extracting information. In this example, at 402, an object is received. The object is the object to be viewed by the user. For example, the object is received from a database for display to a user. At 404, the tag phrases assigned by the user to the object are determined. In some embodiments, the number of times each tag phrase has been used by the user is also determined. At 406, optionally, the tag phrases assigned by others to the object are determined. In some embodiments, the number of times each tag phrase has been used by others is also determined. At 408, content is selected for display to the user. In some embodiments, the content is selected based on the tag phrases assigned by the user and/or the tag phrases assigned by others to the object. The selection of content may be based more strongly on the tag phrases that have been used a greater number of times. The selection of content may be based more strongly on the tag phrases assigned by the user.

FIG. 5 is a table illustrating an example of information in a user profile. In this example, table 500 is shown to include three objects that have been tagged by a user. In various embodiments, the user profile can include all objects that have been tagged by the user (the full user profile), the most recent objects that have been tagged by the user (the most recent user profile), the object(s) that are currently being viewed by the user (the portion of the user profile associated with the objects being viewed), or any combination of the above.

In this example, the user has tagged three objects. Two of those objects are photos and one is a URL. For example, object ID 324432 is a photo that the user has tagged "restaurant", "san francisco", "yum", and "bargain" with tag strengths 5, no tag strength assigned, 4, and 1, respectively. The user has used tag phrase "restaurant" 34 times, tag phrase "san francisco" 91 times, "yum" 21 times, and "bob" one time.

In some embodiments, an advertiser can specify that advertisements be displayed to users who have profiles matching a certain criteria. For example, an advertiser could determine which profiles correlate with interest in the advertiser's product. For example, a San Francisco restaurant owner could decide that a user who uses tag phrases "restaurant" and/or "San Francisco" could be interested in his restaurant. The owner could specify that the advertisement be displayed when the user has used the tags "restaurant" and/or "San Francisco" a specified number of times.

In some embodiments, an advertiser can specify that advertisements be displayed to users when viewing objects or content associated with certain tag phrases. For example, an advertisement for a restaurant in San Francisco could be displayed when the user is viewing an object tagged "restaurant" and/or "San Francisco" a specified number of times by the user and/or other users.

In some embodiments, advertising content is selected based on the user profile and the object(s) being viewed. For example, if the profile indicates that the user lives in San Francisco, the San Francisco restaurant advertisement could be displayed when the user is viewing an item tagged "restaurant" by the user a specified number of times or tagged "movie" by other users a specified number of times.

Tag phrases with greater tag strengths may be weighted more strongly. For example, a tag phrase with a high tag strength could count for greater than one tag.

In some embodiments, content is selected based on the number of times a user uses a tag phrase relative to other tag phrases. For example, an advertiser could specify that the advertiser's content be displayed when a specified percentage of that user's tags are or relate to a particular tag phrase. For example, a restaurant advertisement is displayed to a user when over 5% of the user's tag phrases are "restaurant".

In some embodiments, there is a thesaurus and/or spell checker for identifying related tag phrases. Related tag phrases could add to the tag count. For example, if an object is tagged "Hawaii" 10 times, "Hawaii" once, and "Hawaiian Islands" three times, this could be equivalent to the object having been tagged "Hawaii" 14 times. In some embodiments, the related tag phrases are weighted less.

Object information could be used to select content. For example, if there are N or more objects in the user profile of type photo, a photography advertisement could be displayed. If there are N or more objects of type classified ad, a shopping advertisement could be displayed. If the objects are of type car_classified_ad, a car advertisement could be displayed.

Tag information and object information can be combined to select content. For example, if there are N objects of type classified advertisement tagged, and M objects tagged "bike", then a bike advertisement could be displayed.

In some embodiments, information in the user profile can be associated with demographic or other information of interest, e.g., to advertisers, including, for example, gender, age (or age group), race, interests, hobbies, occupation, income, etc. In some embodiments, advertisements are selected based on such information. For example, an advertiser can specify that its advertisements be displayed to users whose user profiles match criteria that are associated with a certain demographic.

Various methods can be used to determine such information about a user profile. For example, tag phrases can be used to identify interests. For example, since one of the tag phrases used is "bargain", it can be determined that the user might be interested in inexpensive products. Information can be determined from multiple tag phrases and combined. For example, since another tag phrase is "restaurant", it can be determined that the user is interested in inexpensive restaurants. Tag phrases that have been used a greater number of times may be weighted more strongly. For example, because "san francisco" has been used by the user 91 times, it could be determined that the user resides in or has a strong interest in San Francisco, or products related to San Francisco, such as shopping or services in San Francisco.

Tag phrases with greater tag strengths may also be weighted more strongly. In some embodiments, a metric can be used to determine how well a tag phrase can be associated with or correlated with a user.

FIG. 6 is a table illustrating an example of information in a user profile. In this example, for the objects shown in table 500, information associated with other users is shown. For each object, the tag phrases that other users have used to tag the object and the number of times each tag phrase has been applied to that object are shown. This information can be used to select content for display to the user. For example, when any of these objects is displayed to or tagged by a user, then content can be selected based on this information. For example, content can be selected based on the tag phrases other users have assigned the object. In some embodiments, the user's tags are weighted more heavily than other user's tags.

For example, the photo object with ID 324432 has been tagged "pizza" by 231 users. When this photo is displayed to the user, one or more pizza advertisements could be displayed. The user has not necessarily tagged this photo "pizza". The user has not necessarily tagged this photo at all.

In various embodiments, such information is included in an object profile. For example, in an object profile of object ID 324432 could include the object type, what users have tagged this object, and number of times users have used each tag phrase on the object.

Figure 7:
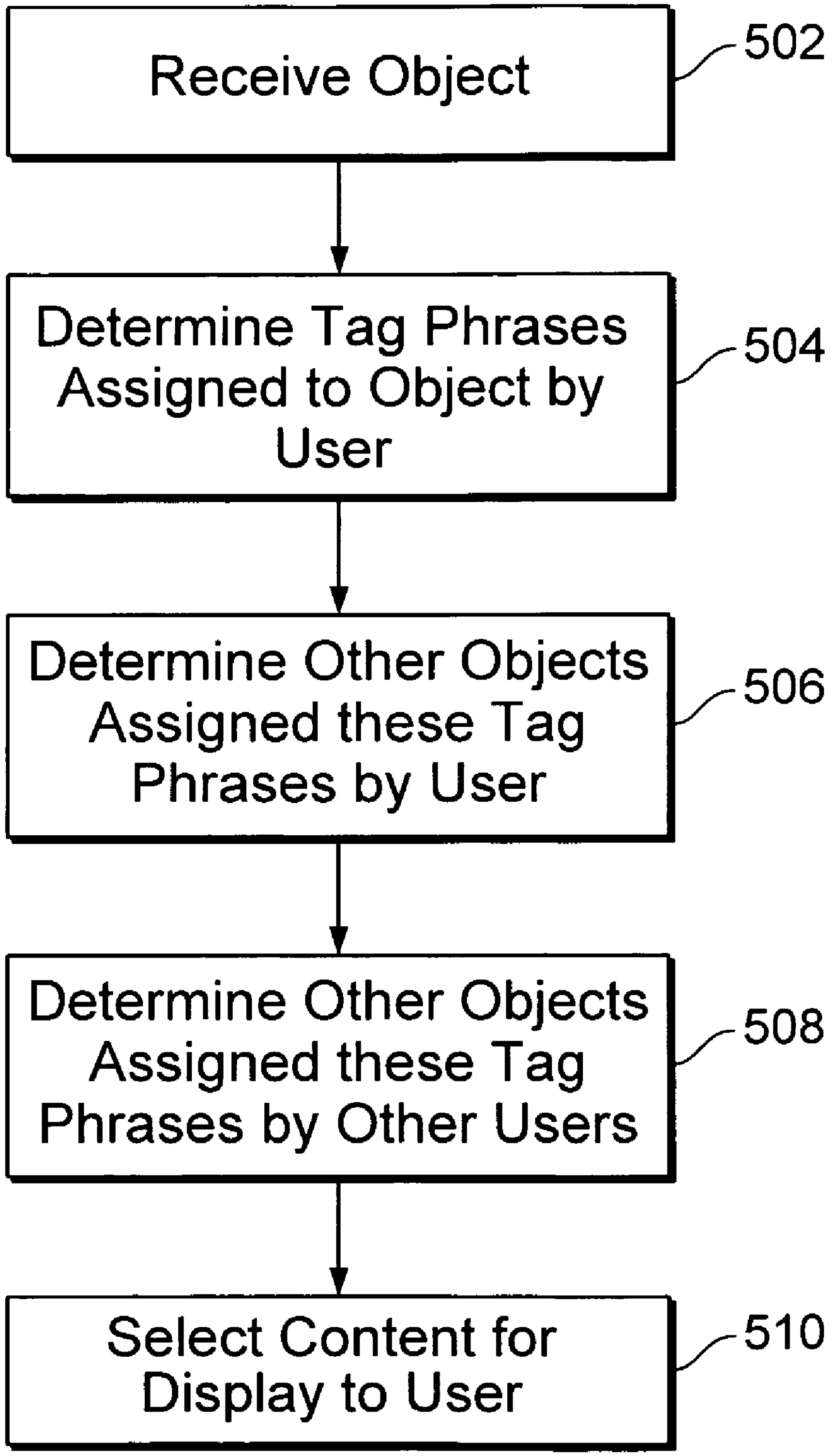
FIG. 7 is a flowchart illustrating an embodiment of a process for driving or extracting information.

FIG. 7 is a flowchart illustrating an embodiment of a process for driving or extracting information. In this example, at 502, an object is received. The object is the object to be viewed by the user. For example, the object is received from a database for display to a user. At 504, the tag phrases assigned by the user to the object are determined. In some embodiments, the number of times each tag phrase has been used by the user is also determined. At 506, other objects assigned these tag phrases by the user are determined. In some embodiments, the number of times other objects have been assigned these tag phrases by the user is also determined. At 508, optionally, other objects assigned these tag phrases by other users are determined. In some embodiments, the number of times other objects have been assigned these tag phrases by other users is also determined. At 510, content is selected for display to the user. In some embodiments, the content is selected based on the objects assigned the same tag phrases by the user and/or by others. The selection of content may be based more strongly on the objects that have been assigned the same tag phrases a greater number of times. The selection of content may be based more heavily on the objects assigned the same tag phrases by the user.

FIG. 8A is a table illustrating an example of other information in an object profile. In this example, object ID 324432 of object type photo has been tagged by the user with tag phrase "san francisco" 91 times. In addition, the tag phrase "san francisco" has been assigned by the user 21 times to an object of type classified and nine times to an object of type restaurant.

For example, if a user is viewing the photo with object ID 324432, then it is determined that "yum" is a tag phrase. Other objects the user has tagged "yum" include restaurants. Thus, the user might be interested in restaurants or food. Other objects that others have tagged using "yum" include recipes. Thus, the user might be interested in recipes or cooking, even though the user may not have directly tagged any recipe "yum". Thus, content can be selected based on other tag phrases or object types associated with object(s) tagged by the user. For example, if an advertiser specifies "yum" and "recipes" as the tag phrases that would cause the advertiser's content to be displayed, then in this case, the advertiser's content would be displayed.

FIG. 8B is a table illustrating an example of information in a user profile. In this example, information can be determined from the types of objects the user chooses to tag. In this example, it could be determined that a user is interested in restaurant or food related content based on the number of times a "restaurant" object has been tagged. It could also be determined that the user is interested in cars, since there are 212 objects of type "car_photo" that the user has tagged. Thus, the number of times an object or object type has been tagged can be used to select content.

FIG. 8C is a table illustrating an example of information in a user profile. In some embodiments, the objects and object types are contributed by users and/or applications (which are associated with or owned by users).

In this example, the types of objects that have been contributed by this user are listed, as well as the number of objects of each type that have been contributed. In addition, whether the object type was defined by this user is shown. In some embodiments, object types can be defined and contributed by users. For example, the object type "car_blog" has been defined by the user, but an object of type "car_blog" has not yet been contributed by the user.

In some embodiments, because the object type "garden_photo" was contributed by the user 87 times, it can be determined that the user is interested in gardens. Similarly, it could be determined that the user is interested in cars because the object type "car_blog" was defined by the user, even if no objects of that type have yet been contributed by the user or others. A garden store could specify that its advertisements be displayed to a user who has contributed a specified number of objects of a type that includes the string "garden".

Hosted Application Server

A hosted application server running multiple applications provided by multiple users is disclosed. In some embodiments, the hosted application server provides a secure interface between users and applications, where varying levels of trust between various users and applications can be designated and handled. In some embodiments, the hosted application server includes a shared data model that includes content provided by multiple users. The data in the shared data model can be made available to multiple applications and multiple users.

Figure 9:
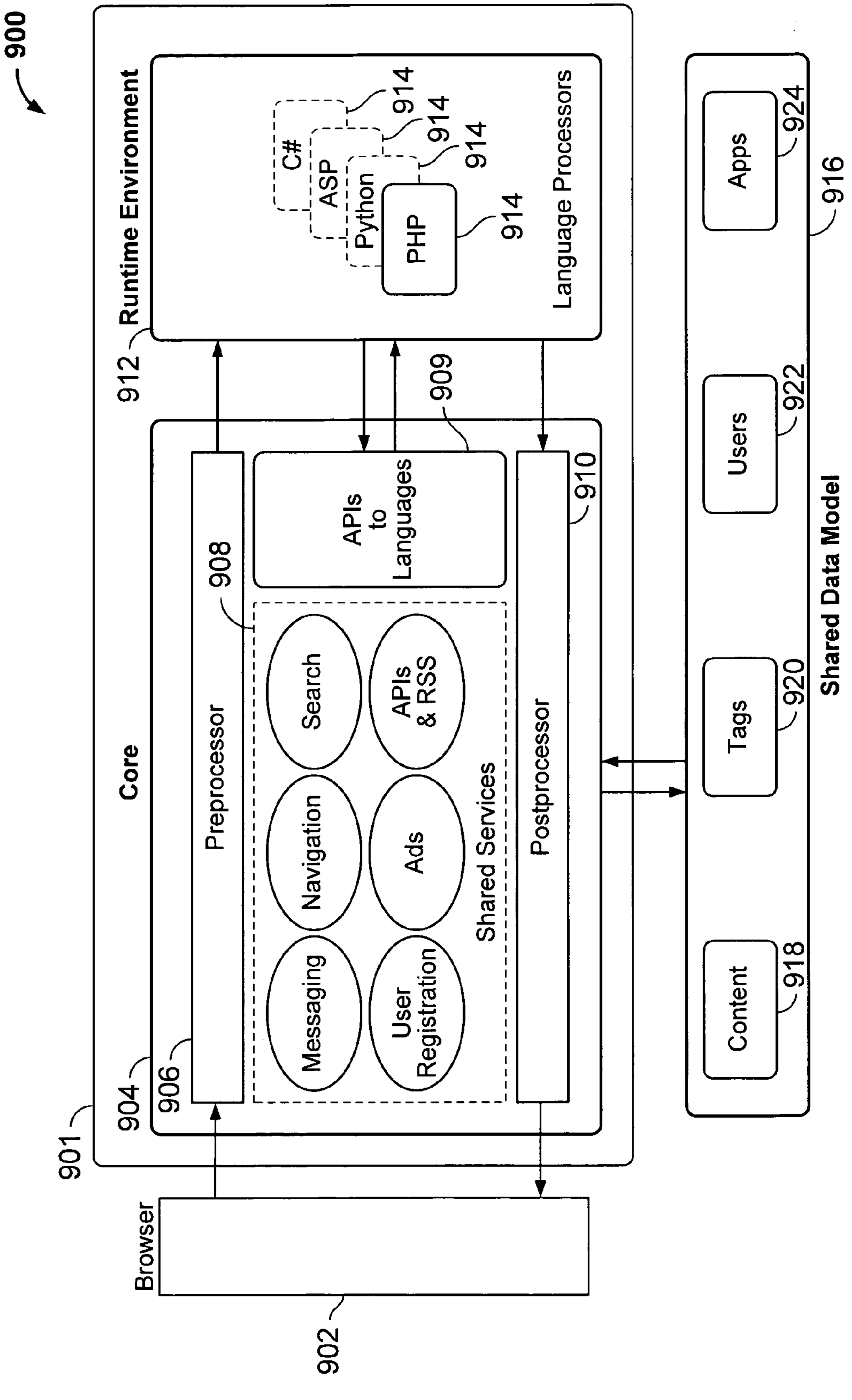
FIG. 9 is a block diagram illustrating an embodiment of a hosted application server.

FIG. 9 is a block diagram illustrating an embodiment of a hosted application server. In the example shown, environment 900 is shown to include hosted application server system 901, browser 902, and shared data model 916. Server system 901 includes core 904 and runtime environment 912. Browser 902 is a web browser or other application capable of viewing data provided over a network, such as the Internet, an intranet or a mobile network.

Core 904 is shown to include preprocessor 906, postprocessor 116, shared services 908, and APIs to languages 909. Preprocessor 906 preprocesses requests from a user at browser 902. For example, preprocessor 906 could include mechanisms for user authentication, security, and session management, as more fully described below. Shared services 908 include various services provided by the host to application developers for use in their applications. For example, shared services 908 could include messaging, navigation, search, user registration, advertising, APIs, and RSS, as more fully described below. Various services not shown could also be provided in various embodiments. For example, external hooks can be provided to other web services such as Amazon, eBay, Google, Visa, Mapquest, etc. APIs 909 can be used to access shared services 908. In some embodiments, core 904 software is written in Java.

Physically, core 904, runtime environment 912, and shared data model 916 can reside on any number of physical devices, each of which can be at any location. In some embodiments, core 904 and runtime environment 912 reside on the same physical device.

Shared data model 916 is a common structure in which data can be stored, shared, and retrieved by multiple applications. Shared data model 916 includes a shared set of data and data types that can be accessed and modified by multiple applications or users. For example, a user or application could add an object to shared data model 916 that can then be accessed by other users and applications. A developer could add a new object type and define attributes associated with that object. That content object type can then be made available to other applications.

Shared data model 916 could include one or more databases or data repositories. Shared data model 916 is shown to include content 918, tags 920, users 922, and applications 924. Examples of content could include photos, comments, reviews, classifieds, or other types of user or application contributed content. Data could be contributed and/or defined by users, applications, or the system. Shared data model 916 could be prepopulated with data. Each object in shared data model 916 can be associated with one or more tags. Objects can be tagged by one or more users. For example, multiple users could tag a particular photo or restaurant review, or a particular application.

Each object can be owned by an application and/or user. In some embodiments, each object is owned by an application and contributed by a user. The owner of an object can designate the object as public or private, where private objects are only provided to the owner or other users designated (e.g., tagged) by the owner (e.g., the owner's friends or family). Each object has a unique object ID in some embodiments.

Various shared services can utilize the data in shared data model 916. For example, a search engine service (e.g., in shared services 908) could be provided that builds an index based on the tags. Advertising can be generated based on tags or content that is retrieved. Profiles can be created based on tag data.

In some embodiments, shared data model 916 includes a SQL database and a search engine that preindexes various queries for faster access to data. In some embodiments, core 904 includes a data access layer for accessing data in shared data model 916.

Runtime environment 912 can run any number of independently written applications. An application can be written in any language that generates HTML, such as PHP, Python, ASP, C#, Java, Javascript, Ruby or .NET or any language that can be used to view information provided over a network (e.g., the Internet, an intranet, a mobile network, or any other type of network). The applications do not all need to be written in the same language. An application includes calls to APIs 909 to access shared services 908.

Any type of application can be developed, any one of which can utilize the set of services and APIs provided by core 904. Examples of applications that could be created include auctions, product reviews, jobs, social networks, alumni networks, etc. Various tools can be provided for application development. For example, wizards, widgets, and example applications can be provided. Widgets could include, for example, listings, user registration, listings, photos, discussions, blogs, reviews, calendars, maps, rankings, ratings, recommendations, reputation, transactions, tagging, etc. Templates could be provided. For example, a marketplace or dating service template could be provided and multiple applications could be independently created based on that template. Tools could be provided for developers of all skill levels. For example, a wizard or a GUI could be provided for beginning computer users, and example applications (e.g., showing calls to various APIs and making use of various services) could be provided to amateur developers. APIs for mobile platforms could be provided, including photo, email, and/or SMS upload/download, GPS tracking, and alerts. Documentation, discussion boards, books, evangelism, and support could also be provided to help users create and maintain applications.

Core 904 maintains security between browser 902 and core 904, and between core 904 and runtime environment 912, as more fully described below. Core 104 can be viewed as a proxy between browser 902 and an application running in runtime environment 912. Core 904 authenticates users so that applications running in runtime environment 912 do not need to handle user authentication. Applications can trust users authenticated by core 904, and users can trust applications that are served by server system 901.

Postprocessor 910 postprocesses responses from applications running in runtime environment 912. For example, post processor 910 assembles output from an application with data from shared data model 916. In some embodiments, a web page is assembled and sent to browser 902, where it is displayed. In some embodiments, the output from the application includes instructions written in HTML. The instructions could include XML tags that refer to certain content object IDs and specify how they should be displayed. The content objects could be retrieved from the content database in shared data model 916 and a page could be assembled based on the specification.

Figure 10:
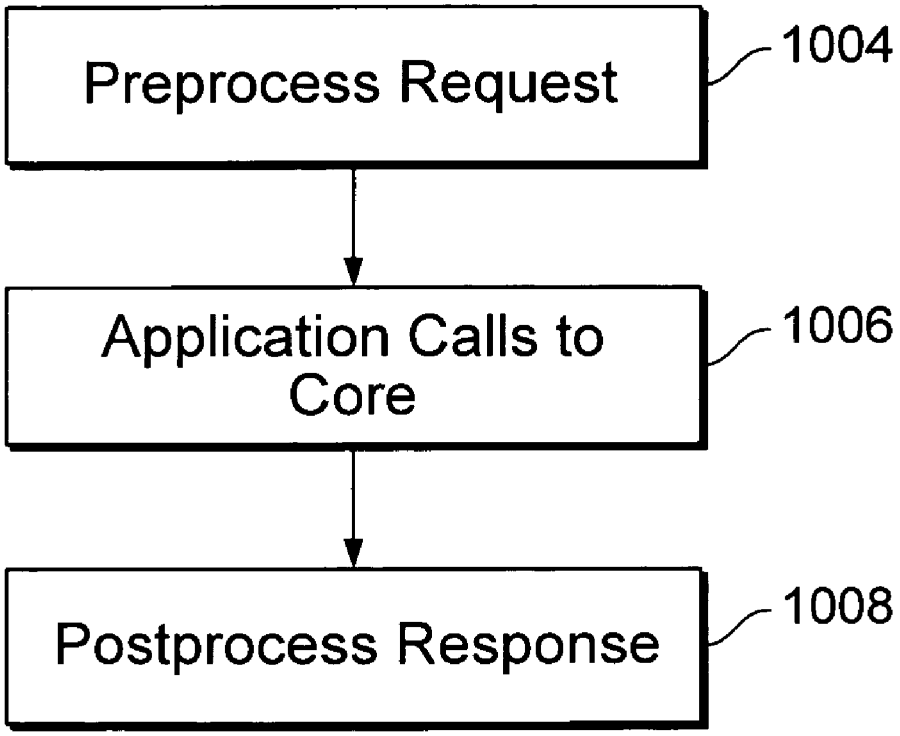
FIG. 10 is a flowchart illustrating an embodiment of a process for handling a user request.

FIG. 10 is a flowchart illustrating an embodiment of a process for handling a user request. In some embodiments, this process is implemented on core 1004 when a request to access an application is made (e.g., a user enters the URL associated with the application). In the example shown, the process begins at 1004, in which a request is preprocessed. Preprocessing could include, for example, authenticating the request or performing other security related functions. In some embodiments, 1004 is performed by preprocessor 906 in environment 900. At 1006, application calls to the core are handled. For example, runtime environment 912 executes the application code, which could include calls back to the server, e.g., to retrieve data from shared data model 916. At 1008, the response is postprocessed. A response is received from an application and interpreted. For example, XML tags are received, and data is retrieved from the database based on the tags. HTML is generated that includes the data, and the page is delivered to the user. In some embodiments, 1008 is performed by postprocessor 910 in environment 900. These processes are more fully described below.

Figure 11A:
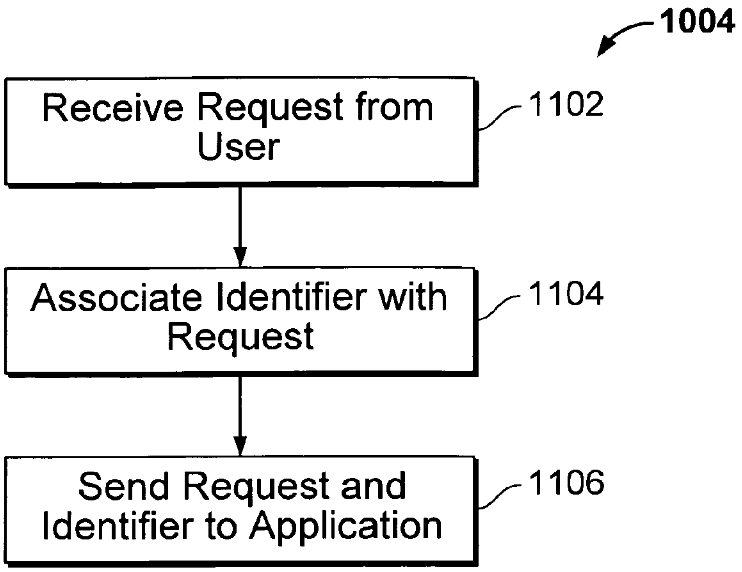
FIG. 11A is a flowchart illustrating an embodiment of a process for preprocessing a user request.

FIG. 11A is a flowchart illustrating an embodiment of a process for preprocessing a user request. In some embodiments, this process is implemented on preprocessor 906. In the example shown, the process begins at 1102, in which a request is received from a user. For example, the request could include the URL associated with the application. A username and a password could also be included. In some embodiments, the username could be anonymous or guest. In some embodiments, when the user does not enter a username, the request is handled as if the user was anonymous. At 1104, an identifier is associated with the request. The identifier can be based on the application and/or the username. In some embodiments, the user is authenticated and an identifier, such as a security token, is generated for the request. For example, the identifier could be a random number or a hash value. In some embodiments, the lifetime of the security token is one page request. In some embodiments, a security certificate, an identifier associated with the location of the user, such as an IP address, or other identifier is associated with the session. In some embodiments, for each identifier, the username, application, and/or role of that user are stored. Examples of roles include guest, user, or administrator. At 1106, the request and identifier are sent to the application. The username and/or role could also be sent to the application for use by the application. The server could store the identifier, username, and role in a lookup table (e.g., in RAM).

Figure 11B:
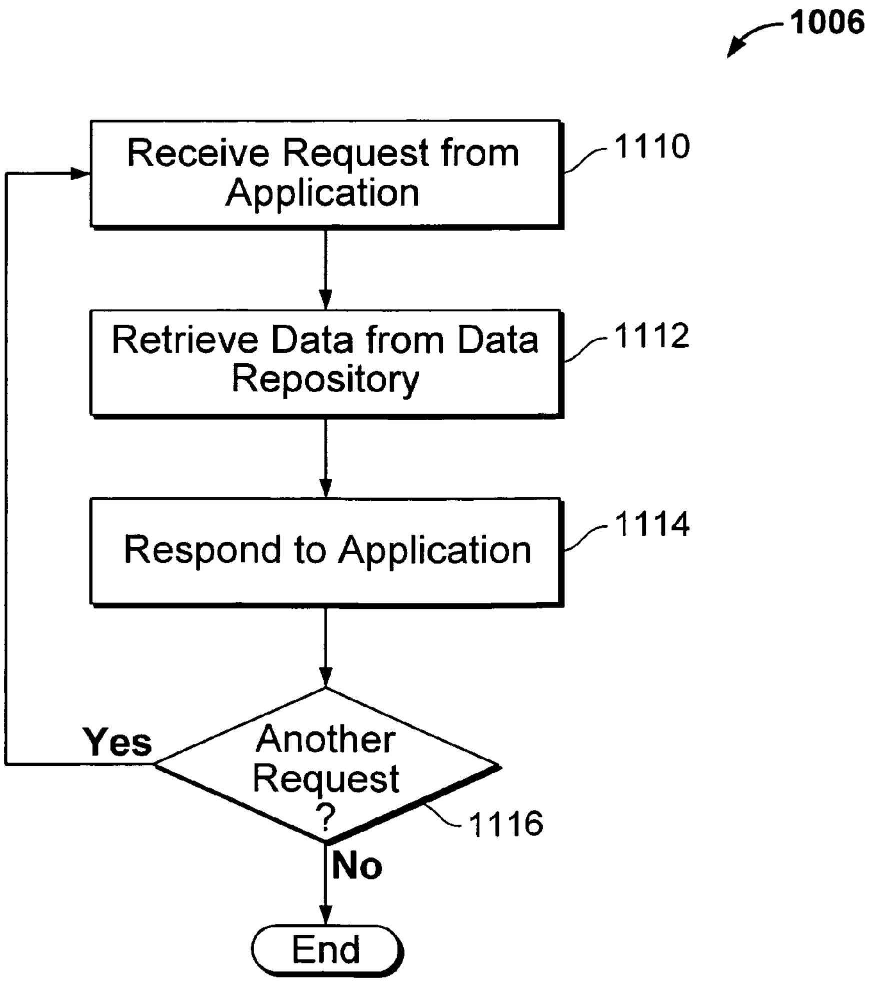
FIG. 11B is a flowchart illustrating an embodiment of a process for handling application requests at a core.

FIG. 11B is a flowchart illustrating an embodiment of a process for handling application requests at a core. In some embodiments, this process is implemented on core 904 when requests are received from an application running in runtime environment 912. In the example shown, the process begins at 1110, in which a request is received from the application. In some embodiments, the request includes the identifier that was sent to the application at 1106. As such, the server can check the identifier to authenticate the request. The request could be delivered using any appropriate network API, such as SOAP. At 1112, depending on the request, data could be retrieved from the shared data model. For example, the request could be a request for all content objects tagged "cat" or all photos (i.e., content objects of type "photo") tagged "cat". At 1112, objects are retrieved to satisfy the request. In some embodiments, only content objects that are public or private, but available to that user (as determined by the identifier included in the request), are retrieved. If the user is an anonymous user, only public objects matching the request are retrieved. At 1114, a response is sent to the application. For example, all content objects tagged "cat" are sent to the application. The request could be delivered using any network API. At 1116, if another request is received, the process returns to 1110. Otherwise, the process ends.

Figure 11C:
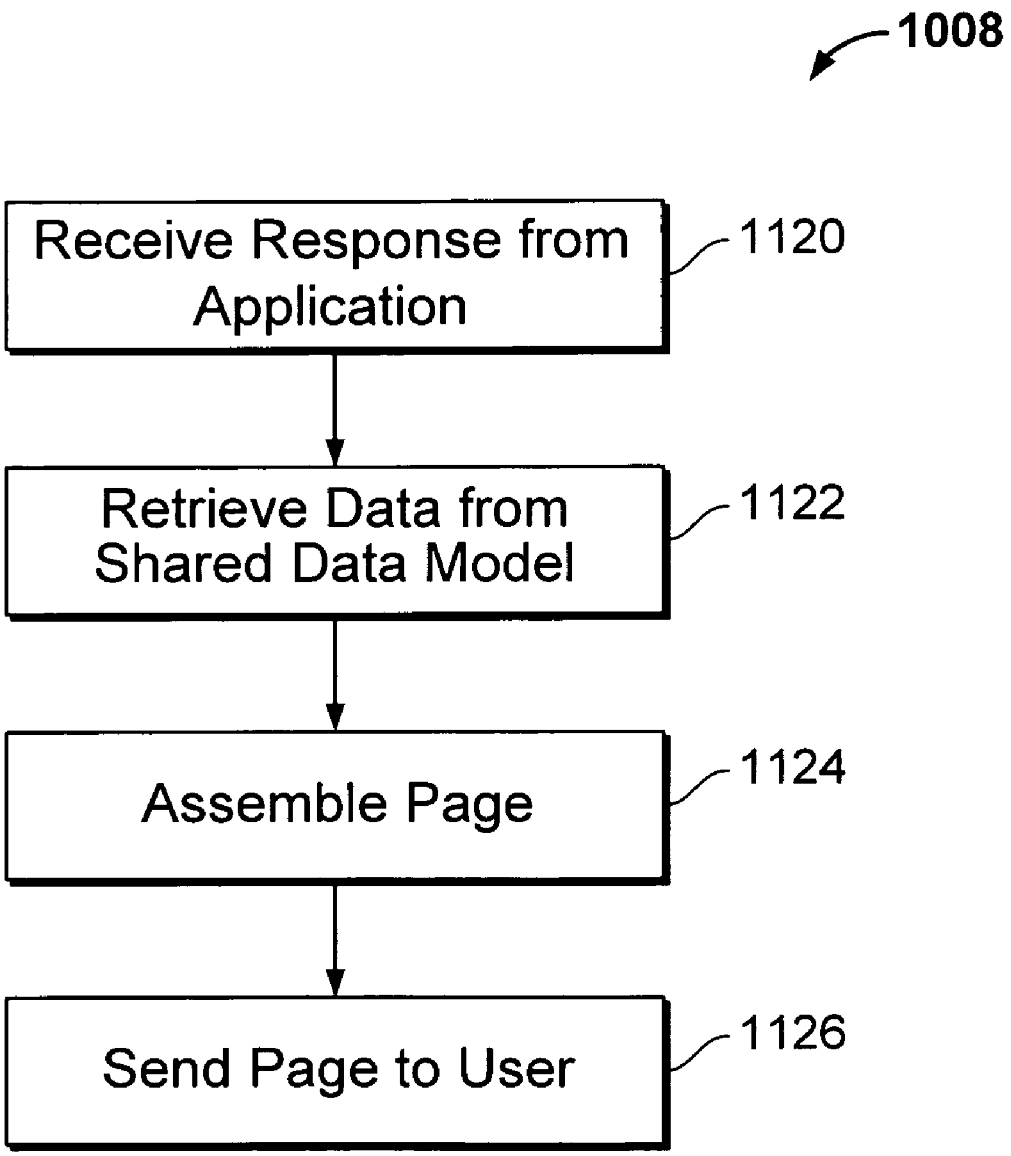
FIG. 11C is a flowchart illustrating an embodiment of a process for postprocessing a response from an application.

FIG. 11C is a flowchart illustrating an embodiment of a process for postprocessing a response from an application. In some embodiments, this process is implemented on postprocessor 910 when a response from an application running in runtime environment 912 is received. In the example shown, the process begins at 1120, in which a response is received from the application. In some embodiments, the response includes the identifier that was received from the server at 1106. As such, the server can check the identifier to authenticate the response. The response can include object IDs to refer to objects in shared data model 916 and a description of how to display them. At 1122, depending on the response, data is retrieved from the shared data model. For example, the response could include a list of object IDs, in which case the objects with those object IDs are retrieved. At 1124, a page is assembled based on the response. The page could be formatted for display in a web browser or any other application capable of viewing data provided over a network, such as the Internet, an intranet or a mobile network. The page could include an HTML, XML, PDF, MP3, mobile, or any other type of file.

In some embodiments, an application can reference a view file that describes how an object should be displayed. The view file can be included in the response at 1122. In some embodiments, the view file is written in HTML and/or XML. An object can be associated with multiple view files contributed by multiple developers. For example, a developer might create for a particular object a view file to display the object in a small or large area. For example, a developer could create an object of type restaurant review with attributes "name", "image", "review", and "url". The view file could specify that that the image of the restaurant be displayed on a first line, the restaurant name be displayed on a second line, and the review be displayed on a third line. The view file could specify that selecting (e.g., using a mouse to click on) the name of the restaurant would lead to the website of the restaurant. In some embodiments, a view file is retrieved from the application that owns the object to be displayed. In some embodiments, a view file is retrieved from a registry of publicly available view files. Developers can contribute view files to the registry. In some embodiments, if there is no description (e.g., a view file) specified, the objects are displayed according to a default description (e.g., a default view file).

In some embodiments, only content objects that are public, or private but available to the particular user and/or application (as determined by the identifier included in the response), are retrieved. For example, if a content object having object ID 923 is specified, and object ID 923 is private and owned by an application other than the one responding, core 904 will not provide that object to the requesting application. Similarly, if that object is private and owned by another user, that object will not be provided. At 1126, the page is sent to the user. As such, the core can be configured to enforce security of content based on the user or the application.

Figure 12:
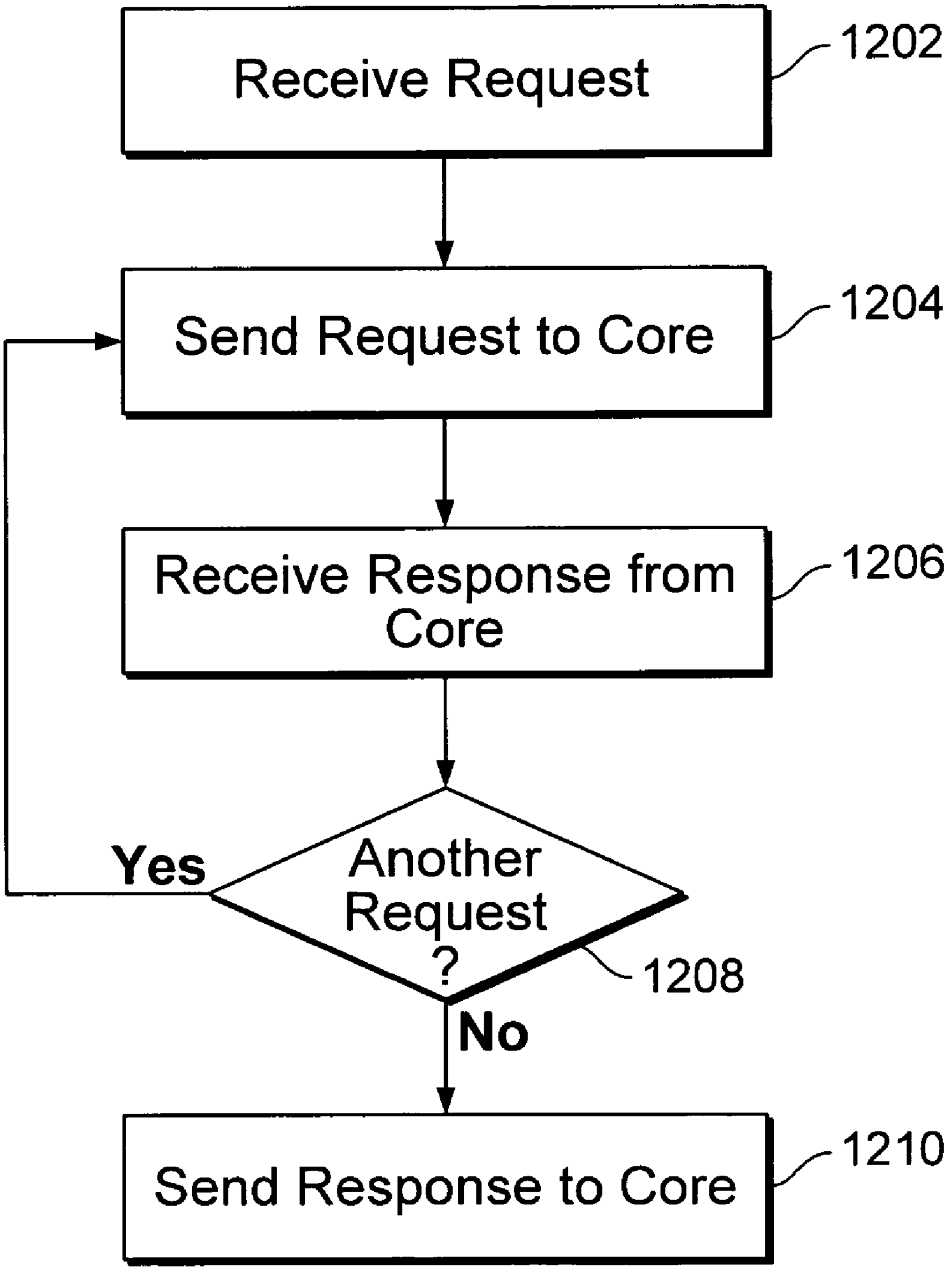
FIG. 12 is a flowchart illustrating an embodiment of a process for responding to a user request.

FIG. 12 is a flowchart illustrating an embodiment of a process for responding to a user request. In some embodiments, this process is implemented in runtime environment 912. In the example shown, the process begins at 1202, in which a request is received. In some embodiments, the request includes the identifier and/or role that was sent from the server at 1106. As such, the server can check the identifier to determine that the user was authenticated (or is an anonymous user or guest, for example). The application can then handle the request based on the user and/or the role of the user with that application. Different application code could be executed based on the user and/or the role. For example, one application might allow a certain user to contribute content, while another application does not. In this way, the creator of each application can decide the rights of each user accessing that application. For example, if the user is anonymous, the application could send a response (i.e., the process would skip to 408, as described more fully below) to send a web page that notifies the user that the user needs to login in order to access this particular application. In some embodiments, the user can have access to different (e.g., better) content by paying a subscription fee to change the user's role to "subscriber". As such, the core can be configured to enforce security of the application based on the user or a role associated with the user.

At 1204, depending on the application instructions, a request (or query) is sent to the core. For example, a request to retrieve all photos tagged "cat" is sent to the core. In some embodiments, the request includes the identifier received at 1206. In some embodiments, the request is delivered using a network API, such as SOAP. For example, a binding can be provided that interprets a PHP request from the application and forwards the request to the core using SOAP. At 1206, a response is received from the core. For example, all photos tagged "cat" are received. The data received from the core is optionally processed. For example, the photos tagged "cat" could be pruned to include only the photos that are also tagged by the user's friends (assuming a list of friends is associated with the user) and/or were added within the last 24 hours. At 1208, if another request is made, the process returns to 1204. Otherwise, at 1210, a response is sent to the core. In some embodiments, the response includes the identifier received at 1106. The response could include the data retrieved at 1206. In some embodiments, the response includes semantic markup tags, such as XML tags, that refer to objects in shared data model 116 (e.g., by object ID), and specifies a view file.

Figure 13:
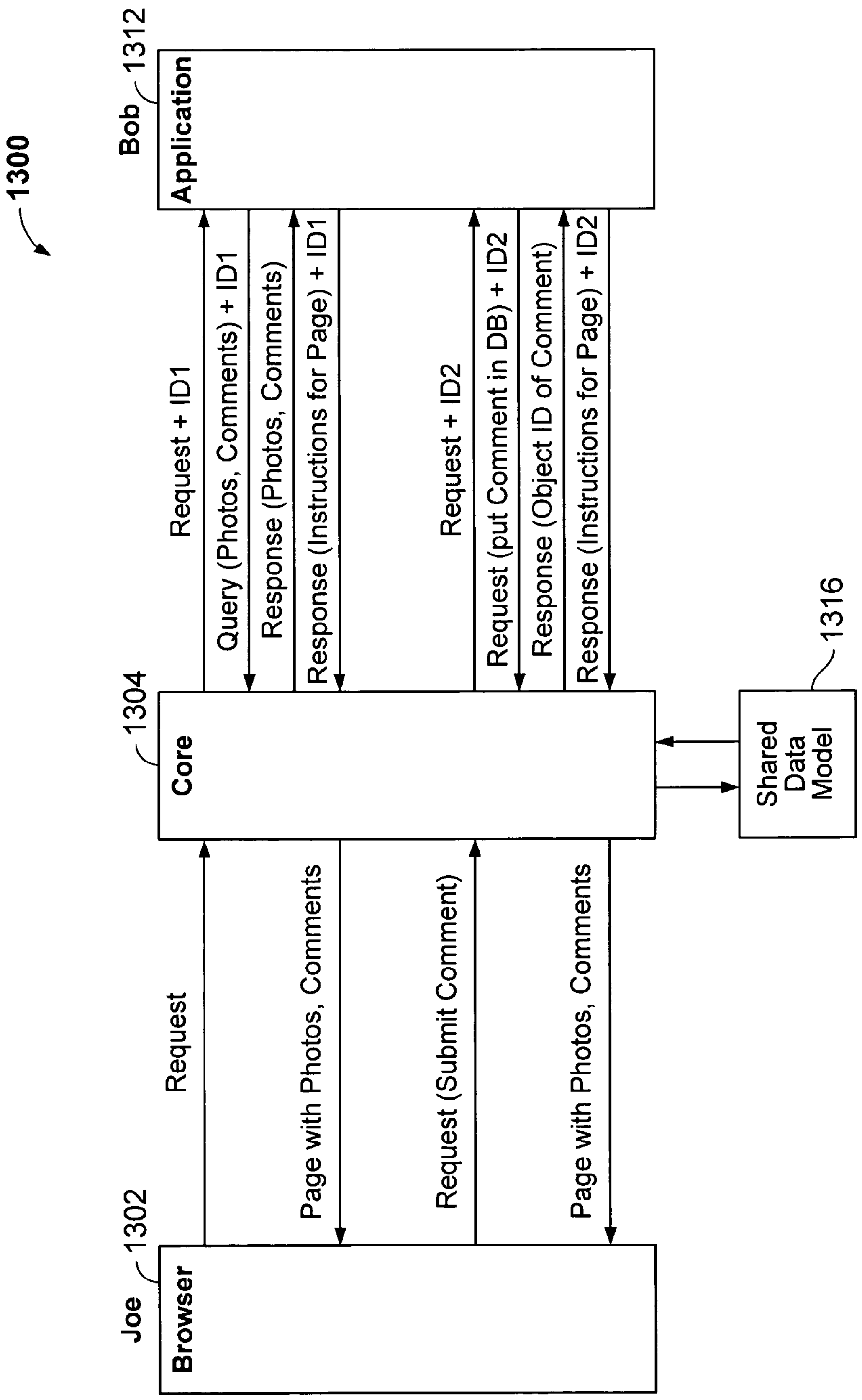
FIG. 13 is a block diagram illustrating an embodiment of an application running on a hosted application server.

FIG. 13 is a block diagram illustrating an embodiment of an application running on a hosted application server. In the example shown, environment 1300 is shown to include browser 1302, core 1304, application 1312, and shared data model 1316. The hosted application server includes core 1304 and a runtime environment running application 1312. In this example, user Joe is running browser 1302. Application 1312 is owned by Bob. Bob is planning a vacation with friends to Hawaii. Application 1312 displays pictures (from shared data model 1316) of places in Hawaii along with his friends' comments on each place. The comments are private and not visible to users who are not Bob's friends. Joe is one of Bob's friends.

In this example, Joe requests Bob's application (e.g., by entering the URL of Bob's application). A request is sent to core 1304 including username joe and a password. Core 1304 receives the request, authenticates Joe, and associates an identifier ID1 with the request. Core 1304 sends the request, ID1, and optionally the username and role to application 1312. Application 1312 receives the request and can determine that the user is joe. Application 1312 sends a query to core 1304 for photos of Hawaii and comments on those photos. The query includes the identifier ID) so that core 1304 can authenticate the request. Core 1304 receives the request, checks the identifier, and retrieves all content objects of type photo that are tagged Hawaii and all content objects of type comment made by Bob and his friends. Core 1304 only retrieves objects that are public or owned by Bob and his friends. These objects are sent to application 1312. Application 1312 receives the objects.

In this example, the structure of the comment object includes the object ID of the photo being commented on. As such, application 1312 can identify the photos that were commented on by Bob and his friends, and then select a few other photos (e.g., the two photos of Hawaii with the most tags) to display on the page for Joe. Application 1312 sends a response to core 1304. The response includes identifier ID1 so that the server can authenticate the response. The response includes the object IDs of the five photos, the object ID's of the comments, and a description of how they all should be displayed (e.g., view files). Core 1304 receives the response, assembles the page of photos and comments according to the response, and sends the page to browser 1302. Joe then sees in the page the photos commented on by Bob and his friends, and the two photos of Hawaii with the most tags.

Joe views the page of photos and comments, and decides to add a comment of his own. Joe enters a comment, and hits a submit button. A request is sent to core 1304. Core 1304 authenticates Joe and associates a new identifier, ID2, with the request. The request is forwarded along with ID2 to application 1312. Application 1312 receives the request and identifies the user as "joe". Application 1312 tags the comment as private and sends a request to core 1304 to put the comment in shared data model 1316. The request includes ID2. Core 1304 receives the request, checks the identifier, and puts the data in shared data model 1316. An object ID is associated with the object. In some embodiments, a response is sent to application 1312 indicating the object ID of the comment. Application 1312 sends a response to core 1304 including the object IDs of the five photos, the object ID's of the old comments, and the object ID of the new comment. Text can be included, such as "Your comment has been accepted and is only viewable by you and your friends." Core 1304 assembles the page of photos and comments according to the response, and sends it to browser 1302 for display. Joe then sees in the page the photos commented on by Bob and his friends, the two photos of Hawaii with the most tags, Joe's newly added comment, and the text "Your comment has been accepted and is only viewable by you and your friends."

In this example, the comment submitted by Joe is private. If it were instead public, then it would then become available to other applications and users for accessing and viewing. In this way, the shared data model can receive data from multiple applications and share data with multiple applications.

Numerous other applications can be written that retrieve and display the same data objects in various ways. For example, multiple users can write multiple applications that store photo objects in different ways. For example, each photo object could include metadata indicating where the photo was taken. The application could retrieve all photos of Hawaii, determine their locations, and display them on a map of Hawaii at the location at which they were taken. Another application written by another independent user could display the same photos in order of where they lie on the RGB spectrum.

Any type of content object could be used by any application. An application could include content contributed by other applications. For example, Bob could create an application that displays restaurant reviews contributed by his friends using his application. In addition, Bob might include other restaurant reviews contributed by other applications in his restaurant review application. Bob might also include classified ads on a portion of his restaurant reviews page because there might be an incentive provided to include them.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer implemented method of selecting an advertisement to deliver to a user in a system storing a plurality of user contributed objects, the method performed by a computer processor device, and comprising:

providing an application programming interface for receiving user defined object types, the user defined object types for defining attributes of user contributed objects;

receiving via the application programming interface a plurality of user defined object types;

storing the plurality of user defined object types;

storing a plurality of user contributed objects, each object having an object type, wherein at least one of the user contributed objects has one of the user defined object types and has a user specified tag;

receiving from a user a request for the at least one of the user contributed objects; and selecting an advertisement to provide to the user based at least in part on the user defined object type of the requested at least one of the user contributed objects, a value of the user specified tag assigned to the requested at least one of the user contributed objects, and a strength of the user specified tag of the requested at least one of the user contributed objects, the strength being specified by a user.

2. A method as recited in claim 1, further including delivering the advertisement to the user.

3. A method as recited in claim 1, further comprising selecting the advertisement to provide to the user based at least in part on a value of an attribute associated with the requested at least one of the user contributed objects.

4. A method as recited in claim 1, further comprising selecting the advertisement to provide to the user based at least in part on a number of times that the user specified tag of the requested at least one of the user contributed objects, has been used.

5. A method as recited in claim 1, further comprising selecting the advertisement to provide to the user based at least in part on a value of the user specified tag of the requested at least one of the user contributed objects.

6. A method as recited in claim 1, further comprising selecting the advertisement to provide to the user based at least in part on a related tag associated with the at least one of the user contributed objects.

7. A method as recited in claim 1, wherein at least one of the user defined object types lacks an associated object of that type.

8. A method as recited in claim 1, further comprising selecting the advertisement to provide to the user based at least in part on a number of times that the user has tagged objects of a particular object type.

9. A method as recited in claim 1, wherein at least one of the user contributed objects has an object type defined by a user different from a user who contributed the object.

10. A computer readable storage medium storing a computer program executable by a processor for selecting content to deliver to a user, the actions of the computer program comprising:

providing an application programming interface for receiving user defined object types, the user defined object types for defining attributes of user contributed objects;

receiving via the application programming interface a plurality of user defined object types;

storing the plurality of user defined object types;

storing a plurality of user contributed objects, each object having an object type, wherein at least one of the user contributed objects has one of the user defined object types and has a user specified tag;

receiving from a user a request for the at least one of the user contributed objects; and selecting an advertisement to provide to the user based at least in part on the user defined object type of the requested at least one of the user contributed objects, a value of the user specified tag assigned to the requested at least one of the user contributed objects, and a strength of the user specified tag of the requested at least one of the user contributed objects, the strength being specified by a user.

11. A computer readable storage medium as recited in claim 10, further comprising selecting the advertisement to provide to the user based at least in part on a number of times that the user specified tag of the requested at least one of the user contributed objects, has been used.

12. A computer readable storage medium as recited in claim 10, further comprising selecting the advertisement to provide to the user based at least in part on a value of the user specified tag of the requested at least one of the user contributed objects.

13. A system for selecting content to deliver to a user, including:

a processor device configured to:

provide an application programming interface for receiving user defined object types, the user defined object types for defining attributes of user contributed objects;

receive via the application programming interface a plurality of user defined object types;

store the plurality of user defined object types;

store a plurality of user contributed objects, each object having an object type, wherein at least one of the user contributed objects has one of the user defined object types and has a user specified tag;

receive from a user a request for the at least one of the user contributed objects; and select an advertisement to provide to the user based at least in part on the user defined object type of the at least one of the requested user contributed objects, a value of the user specified tag assigned to the requested at least one of the user contributed objects, and a strength of the user specified tag of the requested at least one of the user contributed objects, the strength being specified by a user.

14. A system as recited in claim 13, further comprising selecting the advertisement to provide to the user based at least in part on a number of times that the user specified tag of the requested at least one of the user contributed objects, has been used.

15. A system as recited in claim 13, further comprising selecting the advertisement to provide to the user based at least in part on a value of the user specified tag of the requested at least one of the user contributed objects.

* * * * *